Figure 1A:
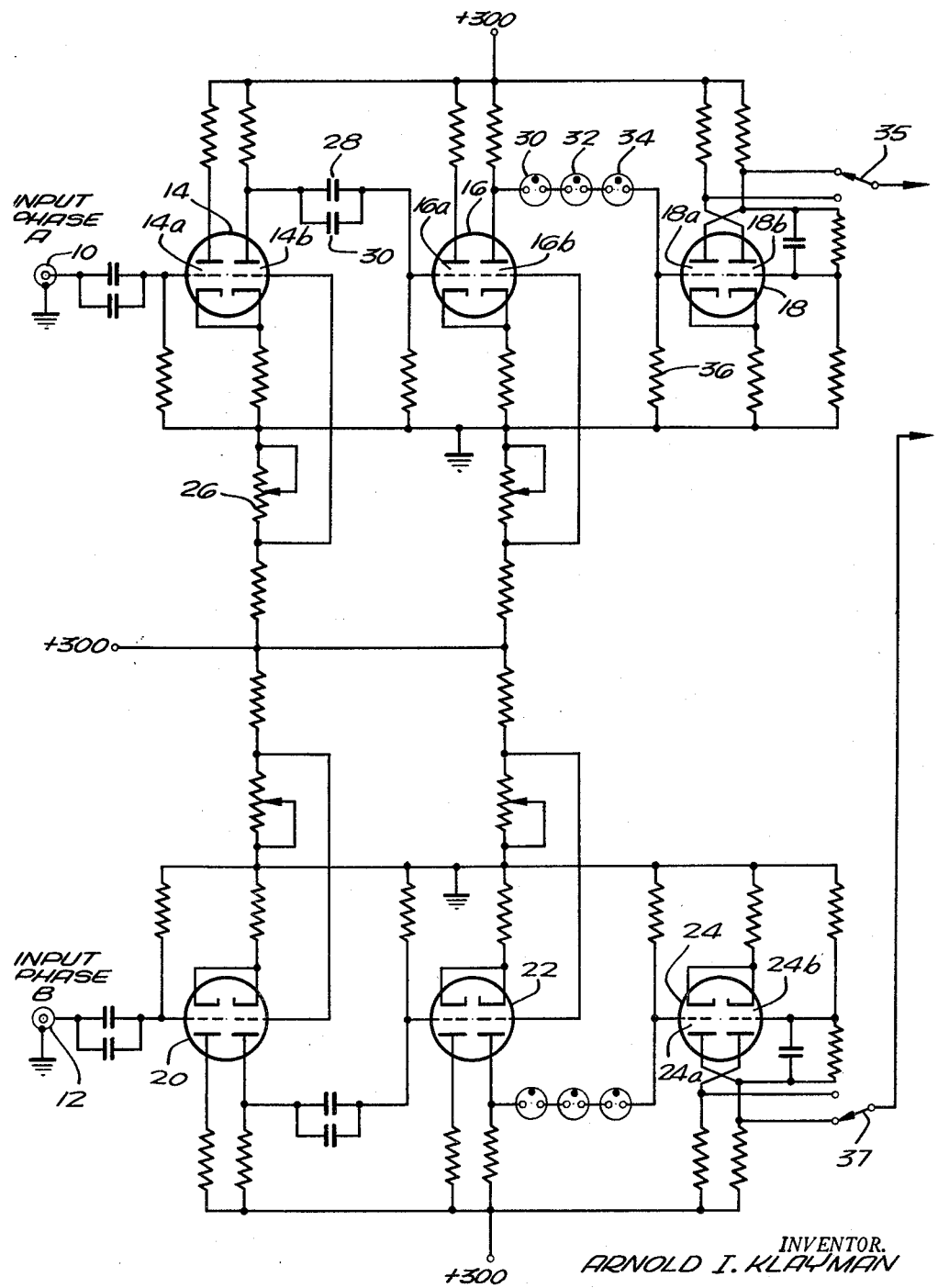

INVENTOR.
ARNOLD I. KLAYMAN
BY Harry C. Jacobs
ATTORNEY

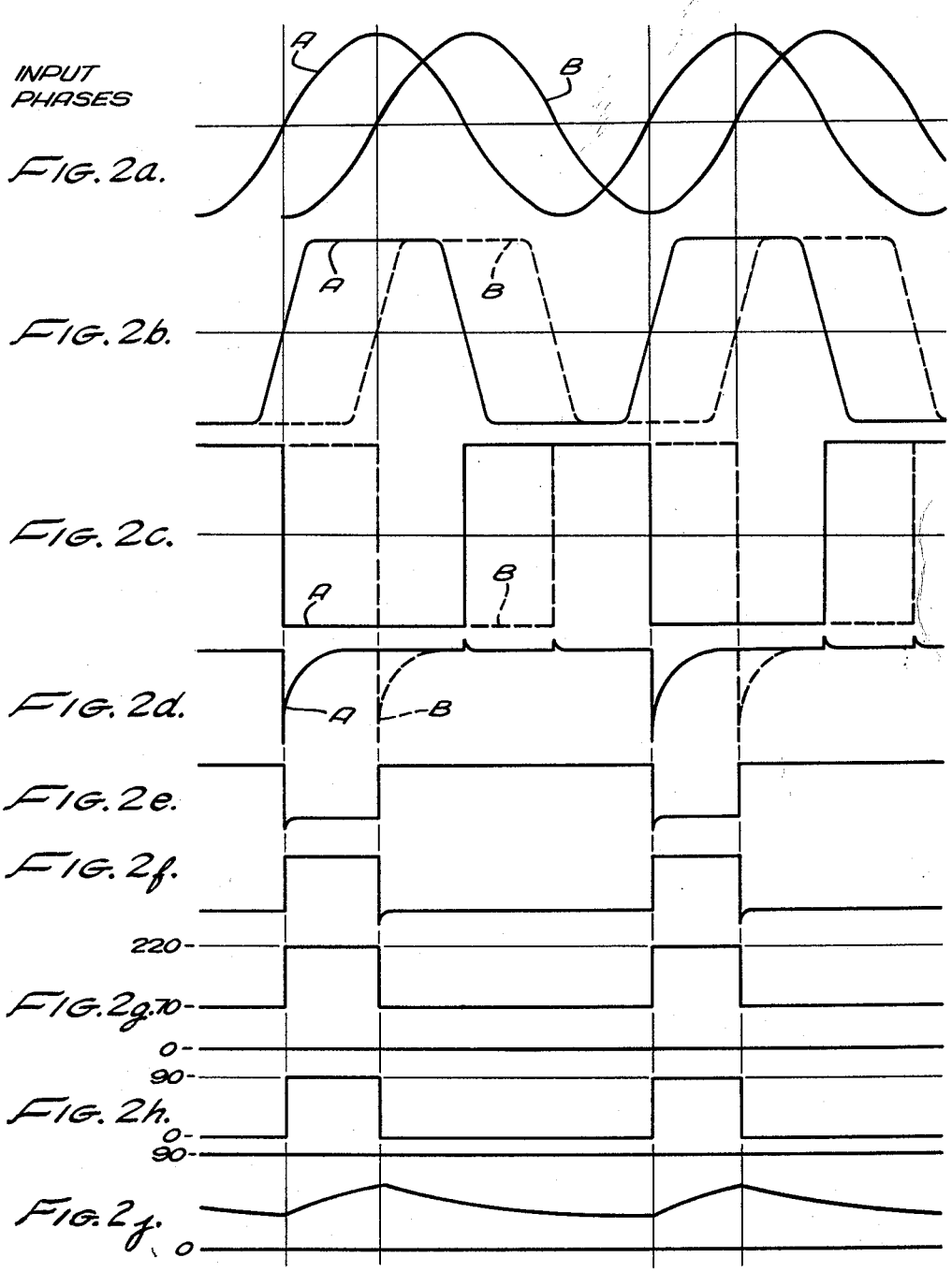

United States Patent Office 3,177,428
Patented Apr. 6, 1965

3,177,428
PHASE DETECTOR INCLUDING CAPACITIVE
AVERAGING AND MIXING MEANS
Arnold I. Klayman, Canoga Park, Calif., assignor to
Borg-Warner Corporation, Chicago, Ill., a corporation
of Illinois
Filed Oct. 30, 1959, Ser. No. 849,872
6 Claims. (Cl. 324—89)

The present invention relates generally to novel apparatus and method for measuring the phase angle or time delay between two periodic waves, as for instance, alternating electrical potentials or voltages. More specifically, this invention pertains to the provision of instruments for indicating the phase difference between two such periodic waves.

Heretofore, it has been general practice in providing apparatus for measuring the phase angle between two periodic waves to firstly, electronically convert such phase difference into a square wave of current flow wherein the width of the current pulses is related to the time delay between such periodic waves. Each of the current pulses is then averaged over the time length of one complete cycle of the input waves so as to afford a current level which is indicative of the phase angle between such waves. Frequently, the latter step has been accomplished by passing the current pulses through a current indicating meter and relying on the mass of the movable components of the meter to effectively average the current pulses with the non-current spaces therebetween. As will be readily apparent to those persons skilled in the art, this arrangement proved satisfactory so long as the periodicity of the current pulses was high enough to maintain the indicating mechanism in a given stable position for a given phase difference. However, as is equally apparent, a point was soon reached where the frequencies of oscillation of the input waves were so low that the indicating means or mechanism was able to respond to each current pulse and to each non-current situation. This caused the meter to flutter or vacillate throughout the measuring operation thereby preventing the taking of accurate readings.

In view of the foregoing it is an object of the present invention to provide a novel method and apparatus for phase detection which overcomes the above serious defects of prior devices.

Another object is to provide phase measuring means which operates satisfactorily irrespective of the frequencies of oscillation of the periodic waves being studied.

Another object is to provide a novel apparatus whereby the phase angle between two low frequency waves may be accurately determined.

Another object is to provide a phase detector as characterized above wherein means is provided for integrating a voltage over a variable period of time corresponding to the phase difference between the two periodic waves being studied, the integral of such given voltage thereby being indicative of such phase difference.

Another object is to provide a phase detector as characterized above wherein is included electronic voltage storage means whereby regardless of low frequencies of the input waves, a continuous reading can be provided by measuring the voltage of said storage means.

Another object of the present invention is to provide a novel method of phase detection which is applicable to all frequencies of oscillation of the input waves.

Another object is to provide a method of phase detection which utilizes the step of integrating a voltage over a period of time directly related to the phase difference between the input waves, whereby the integral of such given voltage is a measure of the phase difference or time delay between the waves being measured.

The novel features which are characteristic of my invention are set forth with particularity in the appended claims. The device itself, however, both as to its organization and mode of operation together with additional objects and advantages thereof will best be understood from the following description of specific embodiments when read in connection with the accompanying drawings, in which, FIGURES 1A and 1B constitute a single circuit diagram or schematic of a phase meter employing the present invention, and, FIGURE 2 shows various curves or wave forms (FIGURES 2a, 2b, 2c, 2d, 2e, 2f, 2g, 2h and 2j) representing signals at various points in the circuits shown in FIGURES 1A and 1B.

Figure 1B:
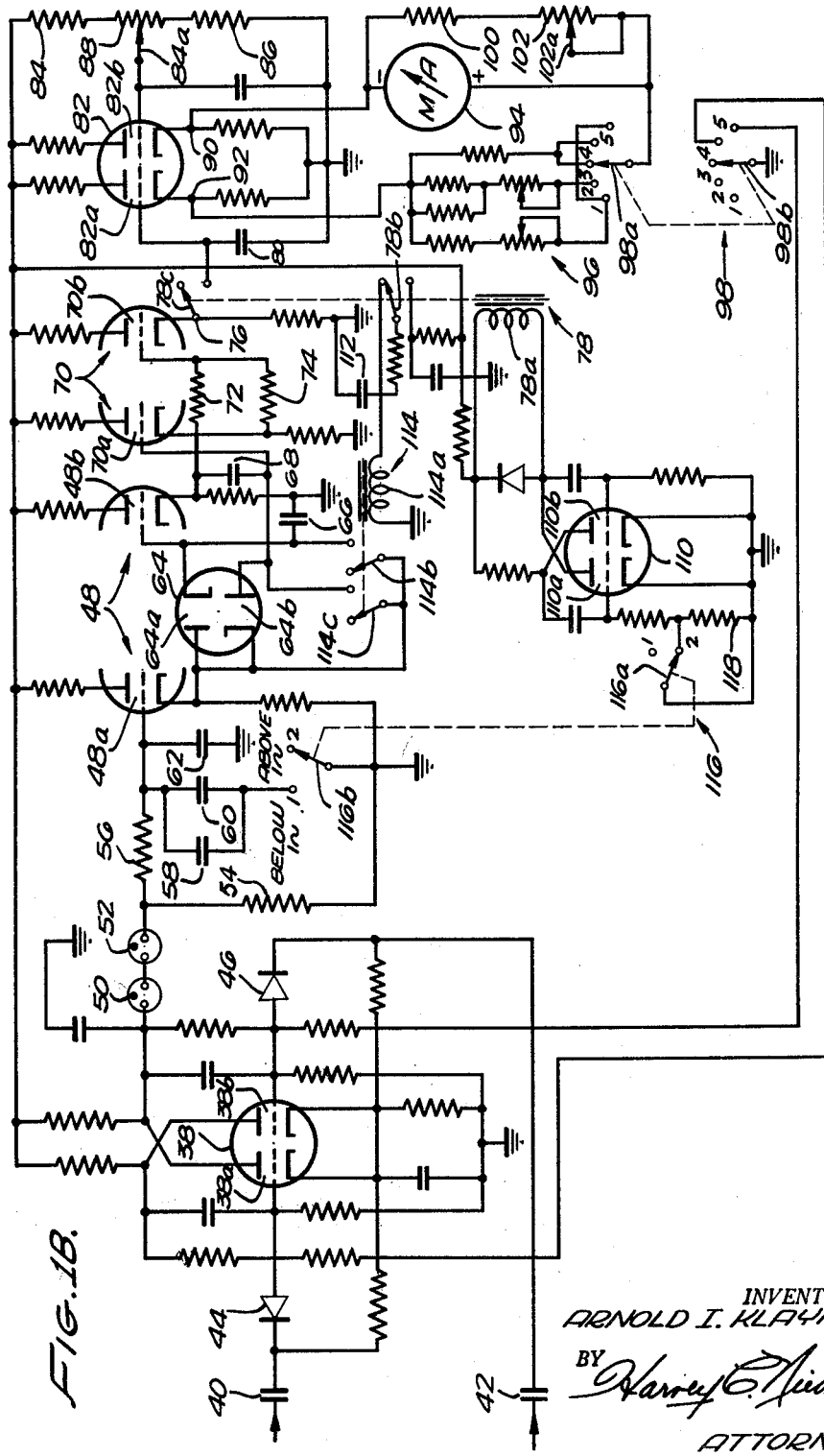

Referring to FIGURE 2 of the drawings, FIGURE 2a therein, shows a pair of sinusoidally or periodically varying input waves A and B which appear at the input terminals 10 and 12 of the phase meter shown in FIGURES 1A and 1B. It is the phase difference or time delay between input phases A and B which it is desired to measure and indicate.

The initial electronic stages of the phase meter shown in the drawings are used primarily to amplify and shape the input phases A and B for subsequent use in later stages. To this extent, FIGURE 1A discloses a pair of circuits, one of which is used for phase A while the other is used for phase B. The phase A circuit comprises stages employing thermionic vacuum tubes 14, 16 and 18, while the phase B circuit comprises tubes 20, 22 and 24. Since the tubes and associated circuitry in the phase A and phase B circuits are identical, beginning from and including the input terminals 10 and 12, the following discussion will be restricted to the phase A circuit, it being fully realized that the same comments hold true for the phase B circuit.

Tube 14 is a double triode composed of a first triode 14a and a second triode 14b. Tube 14 is employed as a cathode coupled amplifier wherein tube 14a is connected as a cathode follower. This stage is used primarily as a buffer or isolation stage so as to electrically isolate the input circuits from the phase meter.

The second triode 14b, of tube 14, is utilized as a grounded grid amplifier with the input signal being applied to the cathode. As the cathode potential changes in relation to the grid potential, the grid being grounded through adjustable resistor 26, tube 14b amplifies the signal impressed on its cathode. Due to the action of tubes 14a and 14b, the output voltage of the latter is a modified square wave having leading and trailing edges which coincide, as a matter of time sequence, with the corresponding cross over points of the input phases A and B. The signal is applied to the grid of tube 16 through coupling capacitors 28 and 30. The circuits for tube 16 are substantially identical with those for tube 14, the first triode 16a being employed as a cathode follower while the second triode 16b is employed as a grounded grid amplifier. In this manner, the input phase A is amplified considerably, on the order of 2500 times, through the first two stages 14 and 16 of the phase A circuitry shown in FIGURE 1A. In like maner, of course, phase B is amplified a similar amount through tubes 20 and 22 which are identical with tubes 14 and 16, respectively.

The output of grounded grid amplifier 16b is applied across a D.C. coupling network consisting of several neon tubes 30, 32, and 34 and a resistor 36. In actual practice, I have found that NE81 tubes work satisfactorily in this particular application of neon tubes and a 1 megohm resistor works very satisfactorily as the resistor 36. Due to this particular circuit arrangement and the fact that the first triode 18a of tube 18 has its grid connected to the juncture of neon tube 34 and resistor 36, an input signal is not applied to tube 18a until the plate potential of tube 16b reaches the firing potential of the neon tubes 30, 32 and 34. When this occurs, a signal is applied to the grid of tube 18a causing it to conduct and hence lowering its plate potential. In view of the interconnection of the grid of tube 18b and the plate of tube 18a, tube 18b is effectively cut off as soon as tube 18a begins to conduct, said tube 18b previously being in a state of conduction. As soon as the plate voltage of tube 16b falls beneath the cut off potential of the neon tubes 30, 32 and 34, the signal on the grid of tube 18a is extinguished thereby causing the plate voltage thereof to increase so as to switch tube 18b from its non-conducting state to its conducting state due to the interconnection of the plate of tube 18a and the grid of tube 18b.

Referring to FIGURE 2 of the drawings, FIGURE 2b shows the wave form of the signals applied to the grids of tubes 18a and 24a. The solid-line square wave is applied to tube 18a and is the result of input phase A as amplified through tubes 14 and 16, causing the plate potential of tube 16b to firstly exceed and subsequently fall beneath the predetermined firing and cut off potentials of neon tubes 30, 32 and 34. Thus, a signal is applied to the grid of tube 18a upon the occurrence of a given phase position (herein, the positive going crossover) of input phase A. In the same manner, the square wave shown in broken lines in FIGURE 2b is applied to the grid of tube 24a, the leading edge of such square-wave occurring at the same or like phase position of phase B as the phase position of phase A which created the leading edge of the solid-line square-wave.

FIGURE 2c of FIGURE 2 shows the shape of the signals which appear at the plates of tubes 18a and 24a, such wave forms being substantially reciprocal of the wave forms which appear at the grids of tubes 18a and 24a respectively. On the other hand, it will be noted that the wave forms at the plates of tubes 18b and 24b very closely follow the wave forms applied to the respective grid element of tubes 18a and 24a.

The square-waves, which are formed by tubes 18 and 24, are then applied to opposite sides of tubes 38 (FIGURE 1B) which is connected as a flip-flop stage. Since each of such square-waves is fed to a separate side of flip-flop 38 through a separate coupling capacitor 40 and 42 respectively, it is seen that the grids of tubes 38a and 38b receive only the varying potentials rather than the D.C. levels of the square-waves. Thus, the only signals which reach the grids of the flip-flop tube 38 are those created by the leading and trailing edges of the square-waves. As will be noted in FIGURE 1B, interposed between the respective coupling capacitors 40 and 42 and the respective grid elements of tube 38, are unidirectional devices or rectifiers 44 and 46 which insure that only the leading edges of the above described square-waves are applied to such grid elements. Thus, referring to FIGURE 2d, applied to the grids of tubes 38a and 38b are negative voltage spikes which, according to the time sequence of the original input phases A and B, coincide with the leading edges of the square-waves which appear on the plates of tubes 18a and 24a. In this regard, manually operable switches 35 and 37, each of which has a first and a second position, are connected respectively in the grid circuits of tubes 38a and 38b to insure that the signal afforded by phase A is applied to flip-flop 38 ahead of the signal afforded by phase B. Each of these switches is capable of inverting the signal afforded by tubes 18 and 24 respectively, to thereby effectively change the phase relationship by 180 degrees. The positive voltage spikes which would be produced by the trailing edges of the square-waves in passing through capacitors 40 and 42, are rendered ineffective by virtue of rectifiers 44 and 46.

Flip-flop 38 is a bi-stable element in that it has two states or conditions in which it will remain until triggered to flip over into the other state. In accordance with the particular time sequence of phases A and B chosen for illustration of the present invention, prior to either of the negative spikes being applied to flip-flop 38, tube 38a is conducting and tube 38b is non-conducting. The latter condition obtains due to the interconnection of the plate element of tube 38a and the grid element of tube 38b; conduction of tube 38a causing the plate voltage thereof to be low as applied to the grid of tube 38b thus cutting off conduction of tube 38b. The first negative spike to be applied to flip-flop 38 is that resulting from input phase A. This is applied to tube 38a driving the grid negative, as shown in FIG. 2e, so as to interrupt conduction of tube 38a. This, of course, causes the plate potential of the tube 38a to increase whereupon, due to the interconnection of the plate of tube 38a and the grid of tube 38b, the grid of tube 38b is driven in a positive direction, as shown in FIG. 2f, thereby causing said tube 38b to conduct. This condition remains until the negative voltage spike generated by input phase B arrives at the grid of tube 38b. This interrupts conduction of tube 38b and due to the interconnection of the plate of tube 38b and the grid of tube 38a, the grid element of tube 38a is driven in a positive direction, so that said tube 38a is again caused to conduct. In this manner, the plate voltage of tube 38a is either high or low depending upon whether said tube 38a is non-conducting or conducting. To further insure that the signal derived from the plate of tube 38a and applied to the first half 48a of a double triode tube 48 is a square-wave having sharp leading and trailing edges which correspond to the time delay between like phase positions on the input phases A and B, tubes 50 and 52 having a sharp cut off potential and a resistor 54 are connected in the plate circuit of tube 38a. Neon tubes 50 and 52 operate as switches to connect the plate of tube 38a to the following circuit when tubes 50 and 52 draw current or to effectively disconnect the same whenever such tubes do not draw current.

It should be noted by reference to FIGURE 2, that the square-wave which is developed at the plate of tube 38a follows substantially the wave form shown in FIGURE 2g, while the signal which is developed at the juncture of tube 52 and resistor 54 follows substantially the wave form shown in FIGURE 2h.

The square-wave potential which is developed at the juncture of tube 52 and resistor 54 is then applied to an integrating network comprising resistor 56 and capacitors 58, 60 and 62 in the grid circuit of tube 48a. Since the signal applied to the grid of tube 48a is taken from the juncture of the group of capacitors 58, 60 and 62 and the resistor 56, such signal substantially follows the curve shown in FIGURE 2j. This obtains by virtue of the fact that the signal at the juncture of tubes 52 and resistor 54 is always a square-wave which varies from zero to a finite voltage, as for instance a potential of 90 volts. That is, when the maximum potential is applied to such juncture (herein 90 volts by way of example), the capacitor 62 (or capacitors 58, 60 and 62 as will hereinafter appear) will be charged in accordance with the exponential curve shown in FIGURE 2j during existence of the 90 volt potential of FIGURE 2h. Upon termination of the voltage at the juncture of tube 52 and resistors 54 and 56, the potential charge on capacitor 62 is caused to decay through resistors 54 and 56. It has been found desirable to have resistor 56 offer considerably more resistance to current flow than resistor 54 so that the resistivity of the charge path of capacitor 62 is substantially the same as that of the discharge path. In this event, the potential applied to the grid of tube 48a will follow the wave form shown in FIGURE 2j, the exponential discharge of capacitor 62 corresponding to the exponential charging thereof. In this manner, the non-linearity resulting from the exponential charging curve is compensated for by the non-linearity of the discharge curve, wherefore the difference between the minimal and maximal potentials of wave form 2j corresponds to the phase difference between input phases A and B.

Further, such difference potential varies linearly with changes in the phase relation of such input phases.

Tube 48a is connected as a cathode follower so that the wave form which appears at the grid thereof, namely as shown in FIGURE 2j, also appears at the cathode thereof. The cathode of tube 48a is connected directly to the plate element of the upper diode 64a and to the cathode of the lower diode 64b of a double diode tube 64. As the potential of the plate of tube 64a increases, said tube conducts through a capacitor 66 in the cathode circuit thereof. This causes capacitor 66 to be charged to the potential applied to the plate of tube 64a until the maximal potential of the curve shown in FIGURE 2j is reached. Thereafter, tube 64a ceases to conduct as the plate potential decreases along the integration curve of FIGURE 2j, while the cathode thereof remains at the maximal potential due to the charge on capacitor 66.

However, as the potential on the plate of tube 64a decreases so does the cathode potential of tube 64b until a value is reached where said tube 64b conducts through a capacitor 68. This continues until the minimal cathode potential is reached, after which tube 64b no longer conducts because its cathode is going positive with respect to its plate potential as determined by the charge on capacitor 68.

Tube 48b is connected as a cathode follower so that the charge on capacitor 66 which is applied to the grid element of tube 48b is transferred to the cathode thereof. Thus, the upper plate of capacitor 68 (as viewed in FIGURE 1B) is charged to the maximal potential reached by the wave form shown at 2j in FIGURE 2, whereas the lower plate thereof is charged to the minimal potential of such wave form.

Connected in circuit with capacitor 68 through the first half 70a of a double thermionic tube 70, is a mixing circuit comprising resistors 72 and 74 of equal value. The potential on the upper plate of capacitor 68 is applied to such mixing circuit at resistor 72 and the potential of the lower plate of capacitor 68 is applied to resistor 74 through tube 70a which is connected as a cathode follower. Since resistors 72 and 74 are of equal resistivity, the potential at the juncture of such resistors is substantially the average of the two potentials applied to the mixing circuit or, in other words, the average of the maximal and minimal potentials of the wave form shown in FIGURE 2j.

Such potential at the cathode of tube 70b, namely, at point 76, is periodically applied to voltage indicating means in accordance with operation of an electromagnetic relay or switch 78 to be hereinafter described in greater detail. Suffice for the moment to note that when the operating winding 78a of switch 78 is energized so as to operate movable contacts 78b and 78c from their unenergized positions shown in FIGURE 1B, capacitor 80 is charged to the potential which exists at point 76 in the cathode circuit of tube 70b.

For purposes of comparing the potential charge on capacitor 80 with a known adjustable reference, a double triode tube 82 is employed. The right hand portion of tube 82, namely 82b, is connected as a cathode follower with the grid element thereof being energized from a voltage divider comprising resistors 84 and 86 and adjustable resistor 88. Thus, in accordance with positioning of the adjustable tap 88a of resistor 88, the potential at both the grid and the cathode of tube 82b is fixed at a certain predetermined value. The other half of tube 82, namely tube 82a, is also connected as a cathode follower so that the potential charge on capacitor 80 is impressed on the cathode of tube 82a.

Interconnecting points 90 and 92 on the cathodes of tubes 82b and 82a respectively, is a current indicating device or ammeter 94 and associated current limiting resistors 96 for measuring the difference in potential between said points 90 and 92. The current limiting resistors 96 which are selectively connected in series circuit arrangement with meter 94 through a five position double wafer switch 98, determine the scale or range of operation of member 94. That is, position No. 1 of wafer switch 98 is the proper setting for the scale of meter 94 to extend from zero to 90 degrees phase difference. Position No. 2 of switch 98 inserts the proper amount of resistance in series with meter 94 to cause the scale of meter 94 to read from zero to 180 degrees. Position No. 3, on the other hand, provides a scale from zero to 360 degrees.

In order to adjust the sliding contact 84a of adjustable resistor 88, it is first necessary to position wafer switch 98 in its fifth position so as to simulate the zero degrees phase condition. Positioning of switch element 98b in its fifth position grounds the grid of tube 38b and the plate of tube 38a. This causes the conditions to prevail which exist when the input phases A and B are in phase. It is then merely necessary to adjust sliding contact 88a of resistor 88 until meter 94, the scale of which is zero–90 degrees, indicates zero degrees displacement between the input phases.

In parallel circuit arrangement with meter 94 is fixed resistor 100 and adjustable resistor 102 which cooperate to afford means for shunting variable amounts of current around meter 94. Adjustment of the movable slide or tap 102a of adjustable resistor 102 should be made when the phase detecting instrument is receiving a pair of input phases which are 360 degrees out-of-phase. In order to simulate this condition, it is merely necessary to position wafer switch 98 in its fourth position so that the grid element of tube 38a and the plate element of tube 38b of flip-flop 38 are rounded through switch element 98b. While in this position, switch element 98b places the requisite amount of current limiting resistance in series with meter 94 for the scale to be from zero to 360 degrees. With the grid of tube 38a grounded, the signal which appears at point 92 is that voltage which will appear there when the input phases A and B are 360 degrees out-of-phase. It is then merely necessary to adjust slidable contact 102a on resistor 102 until the indicator of meter 94 indicates 360 degrees.

In order for the aforedescribed apparatus to automatically and periodically pass the signal which appears at point 76 in the cathode circuit of tube 70b to capacitor 80 for measurement and indication by meter 94, the following timing means is employed. A double triode tube 110 is connected as a free running multi-vibrator and comprises a pair of triodes 110a and 110b which have their plates and grids cross-connected so as to cause such multi-vibrator to continuously change from one state to another. In accordance with the values of the components employed in the multi-vibrator circuits, it is possible to afford the desired time sequence of operation.

The aforementioned control winding 78a of electromagnetic switch 78 is connected in the plate circuit of tube 110a. Thus, when said tube 110a conducts, winding 78a is energized so as to cause contacts 78b and 78c to be operated from their unenergized position shown in FIGURE 1B. Such movement of contact 78c applies the potential from the cathode of tube 70b to the capacitor 80 in the grid circuit of tube 82a, whereupon such potential is indicated by meter 94 as a phase difference between input phases A and B, as above described. Movement of contact 78b to its energized position effectively charges capacitor 112.

Conduction of tube 110a of the multi-vibrator eventually (after a predetermined period of time) increases the potential on the grid of tube 110b thereby causing the latter to conduct. When this occurs, the potential at the grid of tube 110a, which grid is connected to the plate of tube 110b, is eventually driven in a negative direction so that tube 110a is ultimately cut off. Winding 78a of switch 73 is thereby de-energized permitting contacts 78b and 78c to return to their unenergized positions.

Such movement of contact 78b permits the charge on capacitor 112 to discharge through the control winding 114a of an electro-magnetic switch 114 having movable contacts 114b and 114c. Energization of winding 114a closes contacts 114b and 114c thereby effectively short circuiting tubes 64a and 64b causing the charges on capacitors 66 and 68 to be substantially equalized. It has been found desirable to close contacts 114b and 114c for a period of approximately one second to afford sufficient time for the charge on capacitors 66 and 68 to be sufficiently equalized so that subsequent changes in the phase relationship of the input signals can establish new potentials across such capacitors.

Again referring to the multi-vibrator circuit, a manually operable switch 116 is provided with a contact 116a in the grid circuit of tube 110a and a contact 116b in the grid circuit of tube 48a. The switch 116 should be placed in its first position when the frequencies of oscillation of the input signals are below one cycle per second. Under these conditions contact 116b inserts an additional amount of capacitance (capacitors 58 and 60) into the integrating network. This is to insure that the time constant of the integrating network is never shorter than one complete cycle of the input phases.

With contact 116a of switch 116 in its first position, the electrical resistance in the grid circuit of tube 110a is such that multi-vibrator 110 energizes winding 78a of electro-magnetic switch 73 for a period of one second and then permits the same to be unenergized for a period of twelve seconds. This sequence, of course, is repeated continuously during operation of the device.

With switch 116 in its second position, namely when the input frequencies are above one cycle per second, capacitors 58 and 60 are removed from the integrating network and only capacitor 62 remains therein. Also, resistor 118 is removed from the grid circuit of tube 110a thereby causing the winding 78a of switch 73 to be energized for one second and unenergized for three seconds. As will be readily understood, the increased speed of operation is permissible in the latter situation because the frequencies of oscillation of the input phases are sufficiently high.

It is thus seen that applicant has provided a phase detector which will operate satisfactorily irrespective of the frequencies of the signals being compared. It is also seen that applicant's device and method of operation permit automatic indication of the time delay between the several input signals.

Although I have shown and described a specific embodiment of my invention, I am fully aware that many modifications thereof are possible. My invention, therefore, is not to be restricted except insofar as is indicated by the prior art and by the spirit of the appended claims.

I claim:

1. Apparatus for measuring the time delay between two periodic waves, comprising electronic means responsive to said period waves to provide a voltage signal which is established upon occurrence of a given phase position of one of said waves and interrupted upon occurrence of the like phase position of the other of said waves, a resistance-capacitance network in circuit with said electronic means having a capacitor which is charged by said voltage signal through a given resistance and discharged through substantially the same resistance during the period of interruption of said signal, mixing means for averaging the maximal and minimal charges on said capacitor, and means in circuit with said mixing means to measure said average voltage as a measure of the time delay between said period waves.

2. Apparatus for measuring the time delay between two periodic waves, comprising electronic means responsive to said periodic waves to provide a voltage signal which is established upon occurrence of a given phase position of one of said waves and interrupted upon occurrence of the like phase position of the other of said waves, capacitive means in circuit with said electronic means to be charged by said voltage signal during establishment thereof and to be discharged over said period of interruption to provide a continuous voltage curve having maximal and minimal values, mixing means for averaging said maximal and minimal values, and means including timing means in circuit with said mixing means to periodically measure said average voltage as a measure of the time delay between said periodic waves.

3. Apparatus for measuring the time delay between two periodic waves, comprising electronic means responsive to said periodic waves to provide a voltage signal which is established upon occurrence of a given phase position of one of said waves and interrupted upon occurrence of the like phase position of the other of said waves, a resistance-capacitance network having connection with said electronic means having a capacitor which is charged by said voltage signal through a given resistance and discharged through substantially the same resistance during the periods of interruption to provide a voltage curve having peak-to-peak values, individual storage devices for said peak voltages including individual unidirectional control devices therefor whereby said storage devices are individually charged to a separate one of said peak voltages, mixing means in circuit with said storage devices for averaging said peak voltages, and means in circuit with said mixing means to periodically measure said average voltage as a measure of the time delay between said periodic waves.

4. Apparatus for measuring the time delay between two periodic waves, comprising electronic means responsive to said periodic waves to provide a voltage signal which is established upon each occurrence of a given phase position of one of said waves and interrupted upon each occurrence of the like phase position of the other of said waves, capacitive means in circuit with said electronic means to be alternately charged by said voltage signal during establishment thereof and discharged during periods of interruption thereof to provide a continuous voltage curve having maximal and minimal values, voltage storage means in circuit with said capacitive means to retain said maximal and minimal voltages, mixing means for averaging said maximal and minimal voltages in said storage means, and means including timing means to periodically measure said average voltage as a measure of the time delay between said periodic waves and to remove said maximal and minimal voltages from said storage means.

5. Apparatus for measuring the time delay between two periodic waves, comprising electronic means responsive to said periodic waves to provide a succession of voltage pulses each of which is established upon occurrence of a given phase position of one of said waves and terminated upon occurrence of the like phase position of the other of said waves, capacitive means in circuit with said electronic means to be charged by said pulses and discharged during the time periods between said pulses to provide a continuous voltage curve having extreme values corresponding to the time delay between said periodic waves, separate voltage storage devices for said extreme voltages in circuit with said capacitive means to individually retain said extreme voltages, a mixing circuit connected to said storage devices for averaging said extreme voltages, and voltage measuring means controlled by timing means to periodically measure said average voltage as a measure of the time delay between said periodic waves and to remove said extreme voltages from said storage devices for subsequent change in said extreme voltages with change in the time delay between said periodic waves.

6. Apparatus for measuring the time delay between two periodic waves, comprising, a voltage source, electronic means in circuit with said voltage source and responsive to said periodic waves to provide a voltage signal which is established upon each occurrence of a given phase position of one of said waves and interrupted upon each occurrence of the corresponding phase position of the other of said waves, capacitive means in circuit with said electronic means to be charged by said voltage signal during establishment thereof and to be discharged during periods of interruption thereof to provide a voltage curve having extreme values corresponding to the time delay between said periodic waves, resistive means in circuit with said capacitive means to afford a time constant such as to prevent the extreme values of said voltage curve from reaching the value of said voltage signal and zero volts respectively, individual electrical capacitors for storage of said extreme voltages including individual thermionic valve means for control of said capacitors in circuit with said capacitive means to separately charge said capacitors to said extreme values, a mixing circuit connected to said capacitors for averaging the charges on said capacitors, voltage measuring means operable periodically to measure said average voltage as a measure of the time delay between said periodic waves, and means including timing means to alter the charges on said capacitors between the periodic operations of said voltage measuring means to permit subsequent charging thereof to different voltage values.

References Cited in the file of this patent

UNITED STATES PATENTS

| | | |
|---|---|---|
| 2,370,692 | Shepherd | Mar. 6, 1945 |
| 2,492,617 | Boland et al. | Dec. 29, 1949 |
| 2,499,953 | Herzog | Mar. 7, 1950 |
| 2,513,528 | Sohon | July 4, 1950 |
| 2,514,369 | Buehler | July 11, 1950 |
| 2,563,869 | Soukaras | Aug. 14, 1951 |
| 2,626,313 | Napolin | Jan. 20, 1953 |
| 2,758,277 | Daspit | Aug. 7, 1956 |
| 2,774,940 | Bernet | Dec. 18, 1956 |
| 2,877,412 | Most | Mar. 10, 1959 |
| 2,877,416 | Grisdale | Mar. 10, 1959 |
| 2,918,625 | Houghton | Dec. 22, 1959 |
| 2,921,260 | Crandon | Jan. 12, 1960 |
| 2,957,137 | Robinson | Oct. 18, 1960 |

FOREIGN PATENTS

| | | |
|---|---|---|
| 703,189 | Great Britain | Jan. 27, 1954 |

OTHER REFERENCES

"Zero Interrupt Phase Comparison Meter" article in Electronics, November 1953, pp. 177–180, copy in 324–83.